United States Patent
Burnett

(10) Patent No.: US 6,554,342 B1
(45) Date of Patent: Apr. 29, 2003

(54) STORAGE STRUCTURE FOR VEHICLES

(76) Inventor: Scott A Burnett, 62 Lester St., New London, CT (US) 06320

( * ) Notice: Subject to any disclaimer, the term of this patent is extended or adjusted under 35 U.S.C. 154(b) by 0 days.

(21) Appl. No.: 09/978,502

(22) Filed: Oct. 16, 2001

(51) Int. Cl.⁷ .............................................. B62D 43/00
(52) U.S. Cl. ...................... 296/37.6; 296/3; 296/37.1; 224/402; 224/403; 224/405; 211/70.6
(58) Field of Search ................ 296/3, 19, 21, 296/37.1, 37.6, 177, 184; 224/402, 403, 405, 488; 211/70.6

(56) References Cited

U.S. PATENT DOCUMENTS

| | | | | |
|---|---|---|---|---|
| 4,447,099 A | * | 5/1984 | French et al. | 16/382 |
| 4,453,761 A | | 6/1984 | Felburn | 296/43 |
| 4,705,317 A | | 11/1987 | Henri | 296/37.6 |
| 4,915,437 A | | 4/1990 | Cherry | 296/37.6 |
| 5,267,773 A | | 12/1993 | Kalis, Jr. et al. | 296/183 |
| 5,471,950 A | * | 12/1995 | White | 119/165 |
| 5,518,158 A | * | 5/1996 | Matlack | 296/37.6 |
| 5,615,922 A | | 4/1997 | Blanchard | 296/37.6 |
| 5,853,092 A | * | 12/1998 | Goodman et al. | 211/70.6 |
| 6,059,141 A | | 5/2000 | Wojnowski | 220/849 |
| 6,089,639 A | * | 7/2000 | Wojnowski | 296/37.6 |
| 6,095,057 A | * | 8/2000 | Corban | 108/42 |
| 6,124,796 A | * | 9/2000 | Hincher | 340/321 |
| 6,173,842 B1 | * | 1/2001 | Fitzgerald | 211/70.6 |
| 6,176,540 B1 | | 1/2001 | Whittaker | 296/100.02 |
| 6,199,930 B1 | * | 3/2001 | Riley | 296/37.6 |
| 6,364,141 B1 | * | 4/2002 | Ehrgott | 211/70.6 |
| 6,367,628 B2 | * | 4/2002 | Hu | 211/70.6 |
| 6,484,892 B1 | * | 11/2002 | Gooner | 211/70.6 |

* cited by examiner

Primary Examiner—D. Glenn Dayoan
Assistant Examiner—Lori L Coletta
(74) Attorney, Agent, or Firm—Raymond A. Nuzzo

(57) ABSTRACT

A storage structure configured to be mounted to a vehicle. In one embodiment, the storage structure comprises a frame having a pair of side panels, a top panel, a bottom panel and a wall panel attached to the side, top and bottom panels so as to define an interior region of the frame, at least one tool securing device attached to the wall panel wherein the tool securing member is configured to allow tools to be removably secured thereto, and at least one door panel movably attached to the frame. The door panel is movable to a closed position so as to prevent access to the interior region and to an opened position to allow access to the interior region. The door panel is configured to allow viewing of substantially the entire interior region when the door panel is in the closed position. The storage structure further includes a device for attaching the storage structure to a vehicle.

13 Claims, 5 Drawing Sheets

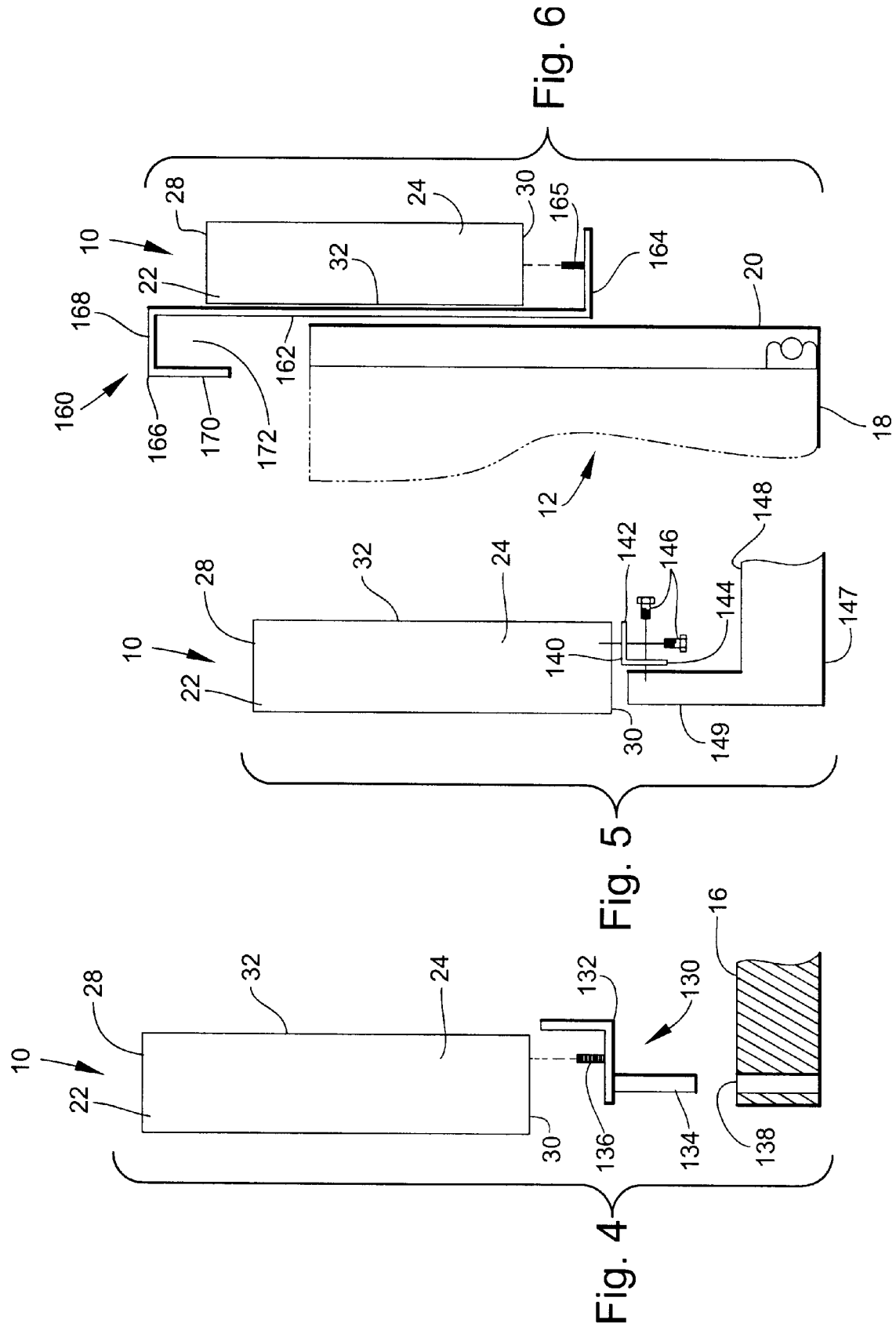

STORAGE STRUCTURE FOR VEHICLES

BACKGROUND OF THE INVENTION

1. Field of the Invention

The present invention generally relates to a storage structure that can be used for vehicles.

2. Problem to be Solved

Landscapers, carpenters, contractors and other tradesmen typically use trucks such as pick-up trucks, dump trucks or flat bed trucks. Many times, such tradesmen place their large-sized tools in the cargo receiving area of the truck thereby consuming valuable cargo space that could be used for other items such as building materials, supplies, etc. Such practices can result in the tools being damaged, lost or stolen. Further inconvenience is created by the necessity for continuously moving such tools about the cargo receiving area to find other tools or items. Additionally, the tradesmen typically remove such tools at the end of the workday only to have to return the tools to the cargo receiving area at the beginning of the next work day. What is needed is a storage structure that allows for the storage of tools in such a manner as to solve the aforementioned problems.

SUMMARY OF THE INVENTION

The present invention is directed to, in one embodiment, a storage structure for a vehicle. In one embodiment, the storage structure comprises a frame having a pair of side panels, a top panel, a bottom panel and a wall panel attached to the side, top and bottom panels so as to define an interior region of the frame. The storage structure includes at least one tool securing device attached to the wall panel wherein the tool securing device is configured to allow tools to be removably secured thereto. The storage structure further includes at least one door panel movably attached to the frame wherein the door panel is movable to a closed position so as to prevent access to the interior region and to an opened position to allow access to the interior region. In one embodiment, the door panel is configured to allow viewing of substantially the entire interior region when the door panel is in the closed position. The storage structure further includes a device for attaching the storage structure to a vehicle.

In another embodiment, the present invention is directed to a storage structure configured to be mounted to a vehicle, comprising a frame having a pair of side panels, a top panel, a bottom panel and a wall panel attached to the side, top and bottom panels so as to define an interior region of the frame, and at least one tool securing member attached to the wall panel. The tool securing member is configured to allow tools to be removably secured thereto. The storage structure further includes at least one door panel that is movably attached to the frame and movable to a closed position so as to prevent access to the interior region and to an opened position to allow access to the interior region. The door panel is configured to allow viewing of the interior region when the door panel is in the closed position. The storage structure includes means for attaching the storage structure to a vehicle.

In a further embodiment, the present invention is directed a storage structure configured to be mounted to a vehicle, comprising a frame having a pair of side panels, a top panel, a bottom panel and a wall panel attached to the side, top and bottom panels so as to define an interior region of the frame, a plurality of tool securing members attached to the wall panel wherein each tool securing member is configured to allow tools to be removable secured thereto, at least one pair of door panels that are movably attached to the frame and are movable to a closed position so as to prevent access to the interior region and to an opened position to allow access to the interior region. The door panel is configured to include mesh screening that allows viewing of substantially the entire interior region when the door panel is the closed position, and handles attached to the door panels to facilitate opening and closing thereof. The storage structure further includes locking devices for locking the door panels in the closed position, and a device for removably attaching the storage structure to a vehicle.

In yet another embodiment, the present invention is directed to the combination of a vehicle having a cargo receiving area that includes a cargo receiving surface having peripheral portions, and a storage structure comprising a frame having a pair of side panels, a top panel, a bottom panel and a wall panel attached to the side, top and bottom panels so as to define an interior region of the frame, at least one tool securing member attached to the wall panel wherein the tool securing member is configured to allow tools to be removably secured thereto, and at least one door panel that is movably attached to the frame and is movable to a closed position so as to prevent access to the interior region and to an opened position to allow access to the interior region. The door panel is configured to allow viewing of the interior region when the door panel is in the closed position. The storage structure further comprises a device for attaching the storage structure to a vehicle.

BRIEF DESCRIPTION OF THE DRAWINGS

The figures are for illustration purposes only and are not drawn to scale. The invention itself, however, both as to organization and method of operation, may best be understood by reference to the detailed description which follows taken in conjunction with the accompanying drawings in which:

FIG. 4 is an exploded side view, partially in cross-section, showing one embodiment of a device for attaching the storage structure of the present invention to a vehicle.

FIG. 5 is a side view showing another embodiment of the device for attaching the storage structure of the present invention to a vehicle.

FIG. 6 is a side view of a further embodiment of the device for attaching the storage structure of the present invention to a vehicle.

DETAILED DESCRIPTION OF THE INVENTION

In describing the preferred embodiments of the present invention, reference will be made herein to FIGS. 1–6 of the drawings in which like numerals refer to like features of the invention.

Figure 1:
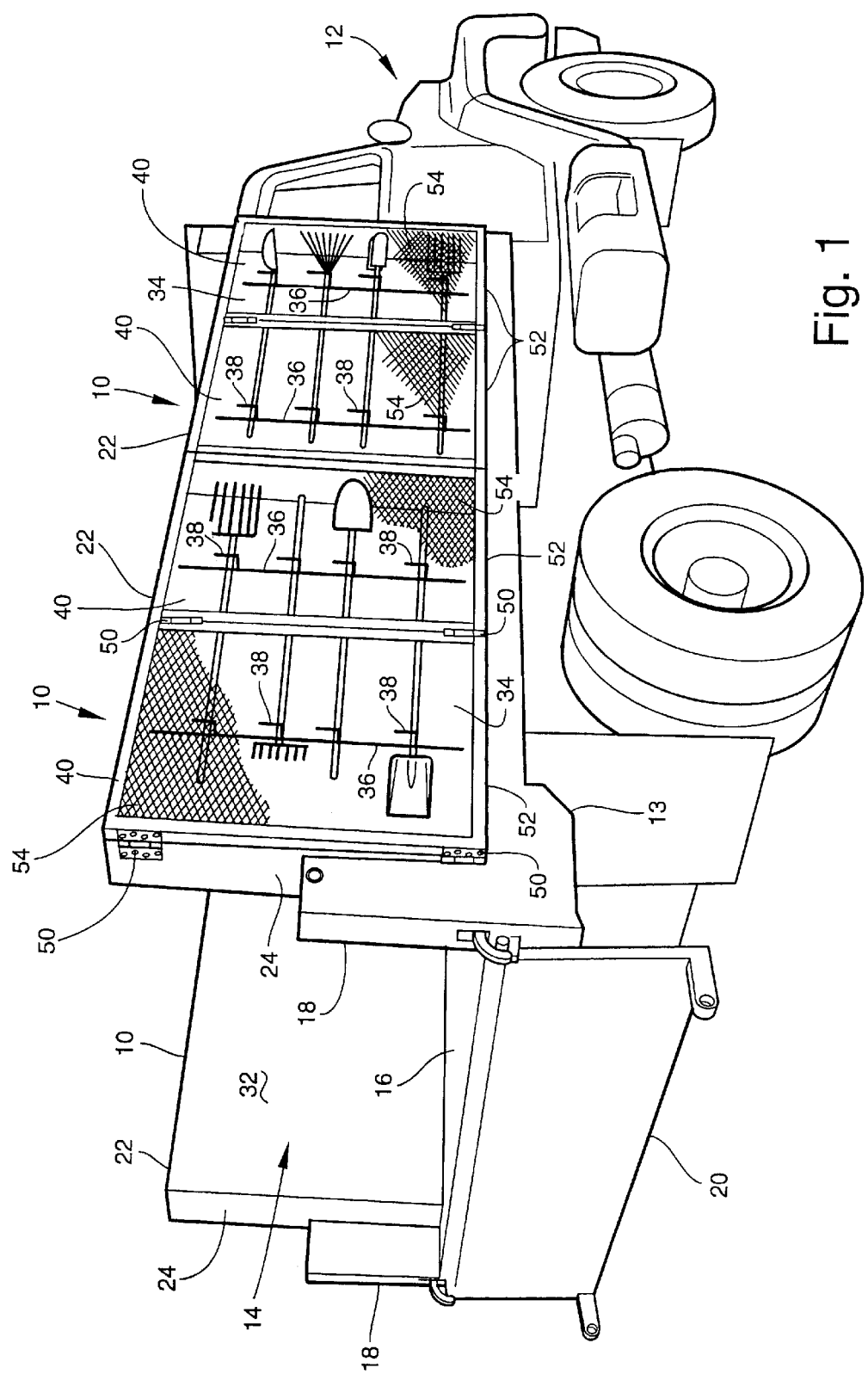
FIG. 1 is a perspective view of a storage structure in accordance with one embodiment of the present invention attached to a vehicle.
Figure 3:
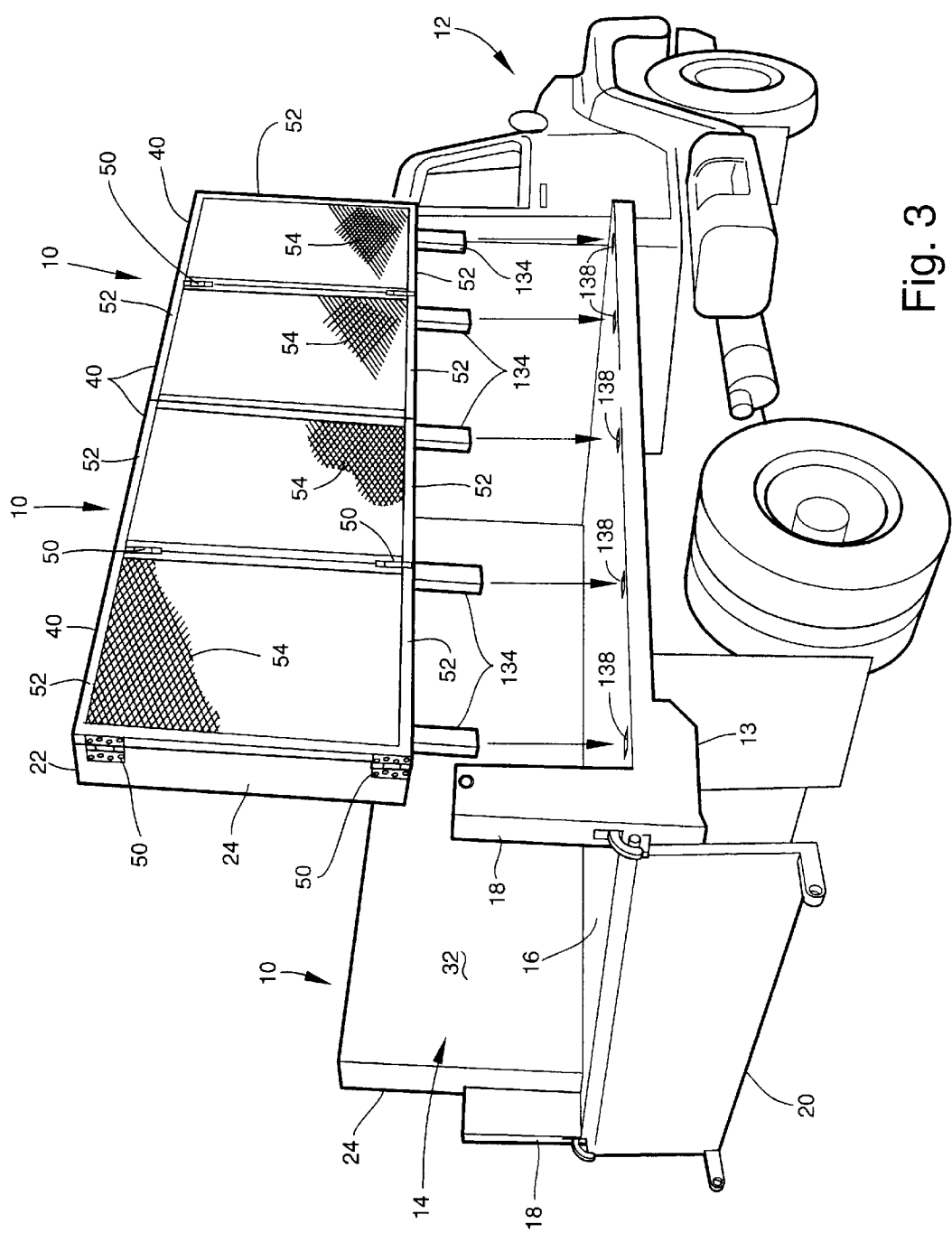
FIG. 3 is an exploded view, in perspective, illustrating attachment of the storage structure of FIG. 1 to a vehicle in accordance with one embodiment of the present invention.

Referring to FIGS. 1 and 3, there is shown storage structure 10 of the present invention. Storage structure 10 is configured to be mounted to vehicle (e.g. flat bed truck, dump truck, etc.) 12. As shown in the figures, two identically constructed storage structures 10 are attached to vehicle 12 and are positioned adjacent to one another. It is to be understood that the actual number of storage structures 10 used depends upon the size of the vehicle. Vehicle 12 includes body 13, cargo receiving area or region, generally indicated by the number 14, a cargo receiving surface 16, tail gate support members 18 and tailgate 20. Tail gate 20 is movable attached to members 18.

Body 13 is referred to as a "dump body" in the industry. However, other body types are used in the industry such as "rack body" and "mason dump body". Therefore, it is to be understood that although vehicle 12 is shown to have a dump body configuration, storage structure 10 can be used with vehicles having other body types or styles.

As shown in FIG. 1, two storage structures 10 are shown, each one mounted to the peripheral area of cargo receiving surface 16.

Referring to FIGS. 1, 3 and 4, storage structure 10 generally comprises frame 22 having a pair of side panels 24, top panel 28, a bottom panel 30 and wall panel 32. Wall panel 32 is attached to side panels 24, top panel 28 and bottom panel 30 so as to define an interior region 34 for storing tools therein. Frame 22 includes a plurality of vertically extending members 36 to which tools (e.g. shovels, rakes, etc.) are removably secured. In one embodiment, vertically extending members 36 also function to provide structural support and integrity to frame 22. In one embodiment, vertically upstanding members 36 are configured as rails that are attached to wall panel 32. In one embodiment, vertically upstanding members 36 are configured as ribs that are integral with wall panel 32. Securing members 38 are removably attached to vertically upstanding members 36. Each vertically upstanding member 36 is configured so as to provide a plurality of locations where securing members 38 can be removably attached. Thus, the positions of securing members 38 upon vertically upstanding members 36 can be adjusted to suit the needs of the user of storage structure 10. In one embodiment, securing members 38 are configured as hooks. In another embodiment, securing members 38 are configured as brackets. Any suitable technique may be used to removably attach securing members 38 to vertically upstanding members 36. Straps (not shown) may be used to further secure the tools to securing members 38.

Referring to FIG. 1, in one embodiment, storage structure 10 further includes door panels 40 that are movably attached frame 22. In one embodiment, hinges 50 are used to movably attach door panels 40 to frame 22. Door panels 40 are movable to a closed position so as to prevent access to interior region 34 and to an opened position to allow access to interior region 34.

In a preferred embodiment, each door panel 40 is configured to allow viewing of interior region 34 when each door panel 40 is in the closed position. As shown in FIGS. 1 and 3, in one embodiment, each door panel 40 comprises a framework 52 and mesh screening 54 that allows viewing of substantially the entire interior region 34 when door panels 40 are closed. However, it is to be understood that other door panel constructions can be used to enable a user to view substantially all of interior region 34 when the door panels 40 are closed. For example, door panels 40 can be fabricated to have safety glass with reinforced mesh screening embedded therein. In another example, a grid work of vertical and horizontal members can be used in place of mesh screening 54. Thus, door panels enable a user to quickly scan interior region 34 without having to open the door panels.

In an alternate embodiment, each door panel 40 is configured to include a removable panel located on the side of the door panel that confronts interior region 34 and disposed over the mesh screening. In such an embodiment, the user can add the panel to the door panel when he or she desires to prevent viewing of interior region 34 when the door panel is in the closed position, or the user can remove the panel to allow viewing of interior region 34 when the door panel is in the closed position. In a further embodiment, each door panel is configured as a single solid panel that does not permit viewing of interior region 34 when the door panel is in the closed position.

Although four door panels 40 are shown in the figures, it is to be understood that the number of door panels actually used depends upon the size of frame 22. Thus, more or less than four door panels may be used. In another embodiment, the door panels are movable attached to the top panels 28 of frame 22 so the door panels can swing in an up and down fashion. In an alternate embodiment, the door panels may be configured as sliding doors that side along tracks that are attached to frame 22 of the storage structure 10.

Grasping devices (not shown) such as handles, knobs or latches are attached to the door panels 40 to facilitate opening and closing of door panels 40. Locking devices (not shown) may be used in conjunction with the grasping devices (not shown) to lock door panels 40 in the closed position so as to prevent unauthorized access to interior region 34. Commercially available locking devices can be used to implement the locking device for locking door panels 40 in the closed position.

In one embodiment, frame 22 is of uni-body construction wherein side panels 24, top panel 28, bottom panel 30 and wall panel 32 are formed from a single piece of material.

Figure 2:
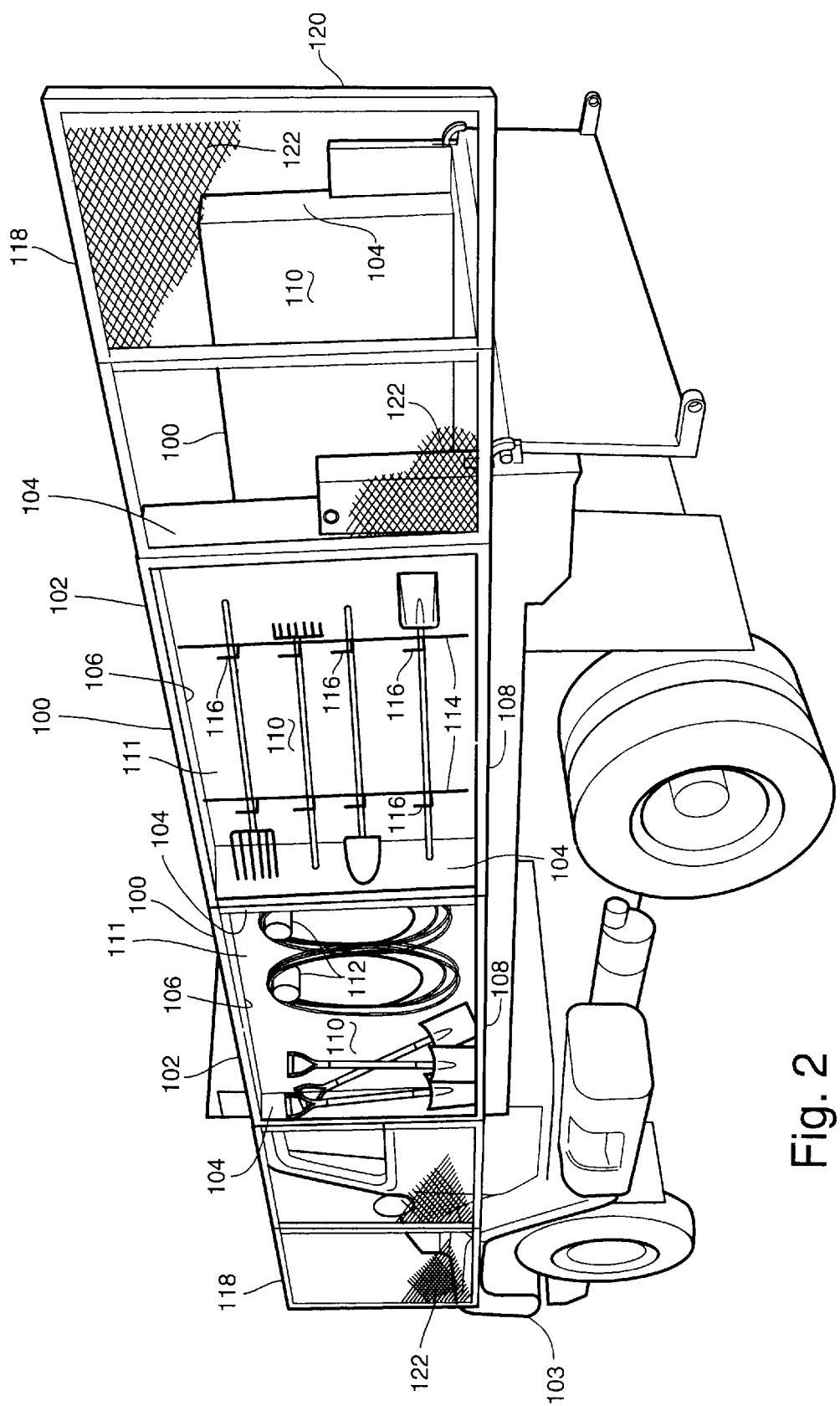
FIG. 2 is a perspective view of a storage structure in accordance with another embodiment of the present invention attached to a vehicle.

FIG. 2 there is shown an alternate embodiment of the storage structure of the present invention. Storage structure 100 comprises frame 102 having a pair of side panels 104, top panel 106, bottom panel 108 and wall panel 110. Wall panel 110 is attached to side panels 104, top panel 106 and bottom panel 108 so as to define an interior region 111 for storing tools therein. As shown in FIG. 2, two storage structures 100 are shown, each one mounted to the peripheral area of a cargo receiving surface of vehicle 103.

One of the storage structures 100 shown is configured to include support members 112 that are removably attached to and extend from wall panel 110. Support members 112 are used to support items such as hoses. Wall panel 110 is configured to provide a plurality of locations where support members 112 can be removably attached. Thus, the positions of securing members 112 upon wall panel 110 can be adjusted to suit the needs of the user of storage structure 100. The other support structure 100 shown is configured so that frame 102 includes a plurality of vertically upstanding members 114 to which tools (e.g. shovels, rakes, etc.) are removably secured. Vertically extending members 114 have the same function and purpose as vertically extending members 36 described in the foregoing description. In one embodiment, vertically upstanding members 114 are configured as rails. Each vertically upstanding member 114 is configured to provide a plurality of locations where securing members 116 can be removably attached. Thus, the positions of securing members 116 upon vertically upstanding members 114 can be adjusted to suit the needs of the user of storage structure 100. In one embodiment, securing members 116 are configured as hooks. In another embodiment, securing members 116 are configured as brackets. Any suitable technique may be used to removably attach securing members 116 to vertically upstanding members 114. Straps (not shown) may be used to further secure the tools to securing members 116.

Storage structure 100 includes door panel 118 that is movable to a closed position so as to prevent access to interior region 111 and to an opened position to allow access to interior region 111. In one embodiment, each door panel 118 comprises a framework 120 and mesh screening 122 that allows viewing of substantially the entire interior region 111 when door panel 118 is closed.

In one embodiment, frame 102 is of uni-body construction wherein side panels 104, top panel 106 and bottom panel 108 and wall panel 110 are formed from a single piece of material.

Figure 4A:
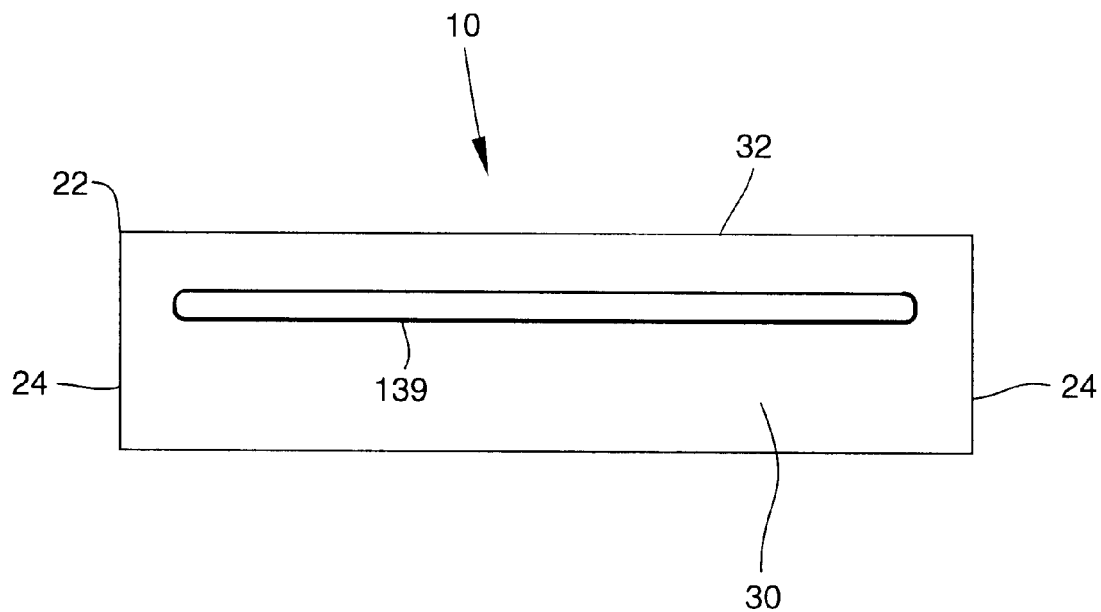
FIG. 4A is a bottom view of a frame of the storage structure shown in FIGS. 3 and 4.

Referring to FIGS. 3, 4, and 4A, there is shown a device for mounting the storage structure of the present invention to vehicle 12. In one embodiment, the aforesaid device comprises adapter plate 130. Adapter plate 130 comprises a generally "L" shaped member 132 and a downwardly extending member 134 that is attached to "L" shaped member 132. Adapter plate 130 further includes threaded portion 136 that is inserted into an opening (not shown) in bottom panel 30 of storage structure 10 (or bottom panel 108 of storage structure 100) A nut (not shown) is used to tightly attach adapter plate 130 to storage structure 10. Downwardly extending member 134 is sized to fit into openings 138 (see FIG. 3) in the cargo receiving surfaces of flat bed-type trucks. Openings 138 are typically available in flat-bed type trucks that enable a user to remove or add wall sections. In one embodiment, adapter plate 130 is configured to have only one downwardly extending member 134 and one threaded member 136 and a plurality of such adapter plates are used to attach storage structure 10 to the cargo receiving surface. In another embodiment, adapter plate 130 is configured to have a length that is generally the same as the length as of storage structure 10 and include a plurality of downwardly extending members 134 and a plurality of threaded members 136. As shown in FIG. 4A, bottom panel 30 has elongated slot 139 that extends for substantially the entire length of bottom panel 30. Slot 139 receives threaded members 136 and allows storage structure 10 to be adjusted laterally on adapter plate 130 prior to tightening the nuts (not shown) on threaded members 136.

Referring to FIG. 5, there is shown another embodiment of the device for mounting the storage structure to vehicle 12. In this embodiment, the aforesaid device comprises bracket 140 that has sides 142 and 144 which are generally perpendicular to each other. Sides 142 and 144 have openings (not shown) for receiving bolts 146. Bolts 146 and corresponding nuts (not shown) are used to attach storage structure 10 (or storage structure 100) to a vehicle 147 (partially shown). Vehicle 147 includes cargo receiving area 148 and wall 149 that is adjacent cargo receiving area 148. Bolt receiving openings (not shown) in bottom panel 30 of storage structure 10 (or bottom panel 108 of storage structure 100), and in wall member 148 allow the storage structure of the present invention to be attached to the wall 148. In one embodiment, bracket 140 is configured to extend for substantially the entire length of storage structure 10.

Referring to FIG. 6, there is shown a further embodiment of the device for mounting the storage structure to a vehicle. In this embodiment, the aforesaid device comprises support member 160. Support member 160 comprises generally vertically extending member 162 and lower horizontally extending member 164 which is attached and generally perpendicular to member 162. Extending member 164 has a plurality of threaded members 165. Support member 160 further includes top member 166. Top member 166 comprises a generally horizontally extending member 168 and a downwardly extending member 170. Members 168 and 170 are generally perpendicular to each other and define region or space 172. Region 172 is sized for receiving the top portion of tail gate 20. Storage structure 10 is supported by member 164. Storage structure 10 and is attached to member 164 by threaded members 165 and corresponding nuts (not shown). Threaded members 165 are disposed through corresponding openings (not shown) in bottom panel 30 of storage structure 10 (or bottom panel 108 of storage structure 100). Thus, the structure of support member 160 allows it to be easily secured to tail gate 20. It is to be understood that support member 160 can be removably attached to other wall members surrounding the cargo receiving area of a vehicle in the same manner in which support member 160 is removably attached to tail gate 20.

In a preferred embodiment, storage structures 10 and 100 of the present invention are fabricated from metals such as iron, steel, stainless steel, aluminum, etc. Storage structures 10 and 100 can be fabricated using various techniques such as welding, riveting, etc. In a most preferred embodiment, the metal is corrosion-resistant. However, storage structures 10 and 100 can also be fabricated from other suitable materials such as rigid plastic.

Support structures 10 and 100 can be constructed as part of the vehicle when the vehicle is being manufactured, or can be attached to the vehicle after the vehicle is manufactured.

Thus, storage structures 10 and 100 of the present invention:

a) allows for easy storage of tools without using precious cargo space of the vehicle's cargo receiving area since the storage structures are configured to be mounted to the periphery of the cargo receiving area;

b) provide for quick viewing of the interior region of the storage structure to find desired tools without having to unlock the door panels;

c) provides a secure means of storing tools without having to remove them from the vehicle after use;

d) can be configured to fit vehicles of varying sizes and types; and e) can be manufactured at reasonable costs.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A storage structure for a vehicle having a body, the storage structure comprising:

a frame having a pair of side panels, a top panel, a bottom panel and a wall panel attached to the side, top and bottom panels, so as to define an interior region of the frame;

at least one tool securing device attached to the wall panel, the tool securing device configured to allow tools to be removably secured thereto;

at least one door panel movably attached to the frame, the door panel being movable to a closed position so as to prevent access to the interior region and to an opened position to allow access to the interior region, the door panel being configured to allow viewing of substantially the entire interior region when the door panel is in the closed position; and means for attaching the frame to the body of the vehicle.

2. The storage structure according to claim 1 wherein the door panel comprises a mesh screening that allows viewing of substantially the entire interior region when the door panel is closed.

3. The storage structure according to claim 1 wherein the door panel is movably attached to one of the side panels.

4. The storage structure according to claim 1 wherein the at least one tool securing device comprises a plurality of vertically extending rails which are attached to the wall panel and provide structural support for the frame, and a plurality of support members removably attached to the vertically extending rails, the support members being configured to allow tools to be secured thereto.

5. The storage structure according to claim 1 wherein the door panel has an interior side confronting the interior region and an exterior side opposite the interior side, the door panel including a view blocking member that is removably attached to the interior side for preventing viewing of the interior region when the door panel is in the closed position.

6. A storage structure configured to be attached to a cargo receiving surface of a truck wherein the cargo receiving surface has a peripheral portion defining openings, the storage structure, comprising:

a frame having a pair of side panels, a top panel, a bottom panel and a wall panel attached to the side, top and bottom panels so as to define an interior region of the frame, the frame having a length;

at least one tool securing member attached to the wall panel, the tool securing member configured to allow tools to be removably secured thereto;

at least one door panel movably attached to the frame and being movable to a closed position so as to prevent access to the interior region and to an opened position to allow access to the interior region, the door panel comprises a mesh screening structure that allows viewing of substantially the entire interior region when the door panel is closed, an adapter plate for attaching the storage structure to the cargo receiving surface of the vehicle, the adapter plate having a length that is generally the same as the frame, the adapter plate having a first portion generally parallel to the bottom panel of the frame and a second portion attached and generally perpendicular to the first portion, the adapter plate further including a plurality of members downwardly extending from the first portion and sized for removable insertion into the openings in the peripheral portion of the cargo receiving surface; and means for attaching the adapter plate to the frame such that the first portion is generally flush with the bottom panel of the frame and the second portion is generally flush with the wall panel of the frame.

7. In combination:

a vehicle having a cargo receiving surface having peripheral portions;

a storage structure comprising a frame having a pair of side panels, a top panel, a bottom panel and a wall panel attached to the side, top and bottom panels so as to define an interior region of the frame, at least one tool securing member attached to the wall panel, the tool securing member configured to allow tools to be removably secured thereto, at least one door panel movably attached to the frame and being movable to a closed position so as to prevent access to the interior region and to an opened position to allow access to the interior region, the door panel being configured to allow viewing of the interior region when the door panel is in the closed position, and means for attaching the frame to one of the peripheral portions of the cargo receiving surface.

8. The combination according to claim 7 wherein the attaching means is configured to removably attach the frame to said one of the peripheral portions of the cargo receiving surface.

9. The combination according to claim 7 wherein the vehicle includes a tail gate movably attached to the cargo receiving surface, the attaching means being configured to removably attach the frame to the tailgate.

10. The combination according to claim 7 wherein the vehicle includes a wall section extending upwardly from the cargo receiving surface and wherein the attaching means is configured to removably attach the frame to the wall section.

11. The combination according to claim 7 wherein the at least one tool securing member comprises a plurality of tool securing members wherein each tool securing member comprises a generally vertically upstanding member attached to the wall panel and a plurality of tool support members to which tools are removably secured.

12. The combination according to claim 11 wherein each tool support member comprises a hook.

13. The combination according to claim 7 wherein the door panel comprises a mesh screening that allows viewing of substantially the entire interior region when the door panel is closed.

* * * * *